United States Patent [19]

Feldman et al.

[11] Patent Number: 4,628,011

[45] Date of Patent: Dec. 9, 1986

[54] REJUVENATION OF NICKEL-CADMIUM AIRCRAFT BATTERY ELECTROLYTE

[75] Inventors: Kieva Feldman, Ottawa; Robert J. Charest, Nepean; Gaston Verville, Ottawa; Joseph L. Lackner, Kanata, all of Canada

[73] Assignee: Her Majesty the Queen in right of Canada, as represented by the Minister of National Defence, United Kingdom

[21] Appl. No.: 459,141

[22] Filed: Jan. 19, 1983

[30] Foreign Application Priority Data

Feb. 16, 1982 [CA] Canada .................................. 396358

[51] Int. Cl.⁴ ........................................... H01M 10/42
[52] U.S. Cl. ........................................ 429/49; 429/95
[58] Field of Search ............................. 429/49, 95, 72

[56] References Cited

U.S. PATENT DOCUMENTS

| | | | |
|---|---|---|---|
| 1,198,449 | 9/1916 | Hutchison | 429/95 |
| 1,296,961 | 3/1919 | Irwin | 429/95 |
| 3,781,175 | 12/1973 | Kinsey | 429/95 |
| 4,055,709 | 10/1977 | Medford | 429/49 |

FOREIGN PATENT DOCUMENTS

| | | | |
|---|---|---|---|
| 2430671 | 3/1980 | France | 429/49 |
| 0584373 | 12/1977 | U.S.S.R. | 429/49 |

*Primary Examiner*—Donald L. Walton
*Attorney, Agent, or Firm*—Nixon & Vanderhye

[57] ABSTRACT

The invention disclosed is a process and apparatus for reducing the concentration of dissolved contaminant in a contaminated liquid, with specific application to the regeneration of contaminated electrolyte in an electrolytic cell, wherein the electrolyte is removed from the cell under vacuum and mixed with a washing liquid e.g. water and clean electrolyte. The mixed electrolyte is returned to the cell and the process repeated until the contaminant concentration in the washing liquid and electrolyte are substantially the same.

4 Claims, 1 Drawing Figure

REJUVENATION OF NICKEL-CADMIUM AIRCRAFT BATTERY ELECTROLYTE

BACKGROUND OF THE INVENTION

This invention relates to a process for reducing the concentration of dissolved contaminant in a contaminated liquid, and in partitcular to a process for regeneration of contaminated electrolyte for use in an electrolytic cell.

To ensure a good ionic conductivity and a low temperature freezing point, nickel-cadmium electrolytic cells are filled with a potassium hydroxide (KOH) electrolyte solution. Depending upon the storage conditions the KOH electrolyte can contain various amounts of carbonate impurities due to the reaction of atmospheric $CO_2$ with the KOH. The carbonate content can also increase during the service life of the cells due to the degradation of the separator material, mainly cellophane and nylon. Since it has been recognized that carbonate impurities affect the cranking performance and the low temperature operation of batteries, Canadian Forces specifications restrict carbonate contamination to a maximum of 5% by weight of the electrolyte. If this limit is exceeded, it is advised to exchange the electrolyte. However, the plates and the separator materials in sintered plate, flooded nickel/cadmium cells are highly porous. Much of the electrolyte in the cell is therefore soaked into the pores and clings to the surfaces of these components. Furthermore, the baffle located below the vent cap frequently makes it difficult or impossible to remove all of the electrolyte which is free in the cell. The extent of these limitations may be illustrated by this example. A 22 amperehour cell constructed of dry materials required 130 ml of electrolyte to fill it to the proper level. Later attempts to empty the cell by dumping the electrolyte yielded only 32 ml. Thus, three-quarters of the electrolyte remained in the cell.

In view of the above facts, if the carbonate content in a cell becomes excessive, it can be reduced by completely extracting the electrolyte under high vacuum and replacing it by fresh electrolyte or by repeatedly draining the small amount of electrolyte which can be removed and admixing fresh electrolyte solution with what remains in the cell. In the above cell, for example, if the carbonate content was 12% by weight and 32 ml of solution were removed and replaced by a carbonate free potassium hydroxide solution and neglecting the resulting change in density, the exchange would bring the level down to: 12% (130−32)/130 = 9%. A second exchange would bring it to 9% (130−32)/130 = 6.8%. Third and fourth exchanges would give 5.1% and 3.9% by weight, respectively.

The example assumed that prior to each succeeding exchange, the old and the added electrolyte were uniformly mixed. If this is not so, the number of required exchanges is increased. The second assumption was that the maximum amount of free electrolyte was removed from the cell each time. This is rarely achieved in practice. Unless a good technique is used, it is quite possible that only about one half as much, or less, is actually removed. This can readily double the number of time-consuming exchanges required.

It is thus obvious that the expeditious upgrading of the electrolyte in these batteries demands effective techniques for thorough mixing and for maximum removal of solution each time.

A conventional procedure for mixing the added electrolyte with the retained electrolyte is to completely discharge and recharge the battery. During the discharge much of the electrolyte is drawn into the plate pack and is expelled again during the recharge. However, this procedure normally requires several days.

Considerable improvement in this process was achieved by providing a reservoir of fresh electrolyte in fluid communication with a cell which is put through a discharge - recharge - overcharge cycle. The fresh electrolyte is mixed in the cell with the contaminated electrolyte. The cycle is repeated until analysis of the cell electrolyte shows the required reduced contaminant concentration. This process which is described in French Pat. No. 2,430,671, published Dec. 5, 1980 in the names of Gabriel Coz et al, is quite time consuming and requires attention during the process. For instance, one cycle requires about 8 hours. Another obvious drawback is the associated energy costs in carrying out the process.

DETAILED DESCRIPTION OF THE INVENTION

Figure 1:
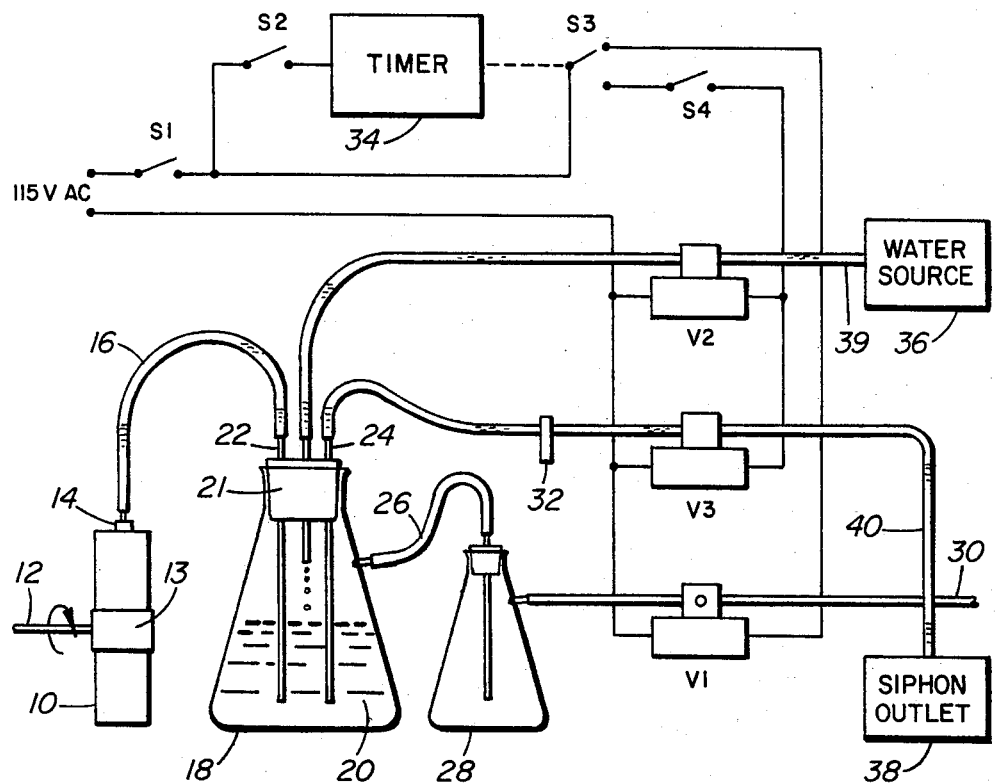
FIG. 1 is a schematic illustrates of an apparatus for carrying out the process of the invention.

According to the present invention a process for reducing the concentration of a contaminant dissolved in a liquid is contemplated, comprising (a) providing a first reservoir containing a volume of said contaminated liquid;

(b) providing a second reservoir in fluid communication with said first reservoir, containing a larger volume of washing liquid which includes a solvent for said contaminant;

(c) applying a vacuum to said first reservoir to withdraw said contaminated liquid from said first reservoir into said second reservoir;

(d) mixing the contaminated liquid with said large volume of washing liquid in said second reservoir;

(e) releasing the vacuum in said first reservoir to return the mixture to said first reservoir; and (f) repeating steps (c) to (e) until the concentration of contaminant in said contaminated liquid and said washing liquid is substantially equalized.

According to another aspect of the invention, an apparatus for the regeneration of contaminated electrolyte outside an electrolytic cell is contemplated comprising: reservoir means for retaining a volume of clean electrolyte; conduit means for fluid connection of said reservoir means to an electrolytic cell containing a smaller volume of contaminated electrolyte; and vacuum means for connection to said reservoir means, such that in use, contaminated electrolyte from said electrolytic cell is withdrawn by said vacuum means from said cell into said reservoir means and mixed therein with said clean electrolyte and when the vacuum is released, the mixed electrolyte is returned to said electrolytic cell.

In the drawing which illustrates a preferred embodiment of the invention, the figure is a schematic illustration of the apparatus according to the invention.

It is thus seen that an electrolytic cell 10 is rigidly mounted on a rotatable shaft 12 by means of a bracket 13. The shaft 12 is rotated to position the cell right-side up or inverted as desired. A modified vent cap 14 and tubing connectors make a fluid connection to tubing 16 which leads into the bottom region of a vessel 18 referred to as the "wash flask". This flask is used as a reservoir for washing liquid e.g. "clean" i.e. substantially contaminant free electrolyte or water 20 for washing as required. For the latter application two other channels permit entry 22 and exit 24 of water from the flask to provide a means for supplying fresh water on a continuous basis if desired. A fourth channel 26 connects the flask via a trap 28 to a vacuum line 30.

Three solenoid operated valves are located in the vacuum line (V1) and in the water inlet (V2) and exit lines (V3) respectively. An electric timer 34 drives a cam (not shown) to operate Switch S3, which in turn cycles the vacuum valve and the other two valves in opposite phases. The water lines are therefore shut off while the vacuum is applied, and vice versa. It is noted that, except for special purposes, water washing may be used without the presence of the automatic water exchange facilities. In this configuration, only the vacuum valve is present and a single tube enters the wash flask via the rubber stopper 21.

To carry out regeneration of electrolyte with the present equipment, one proceeds as follows: a relatively large quantity of fresh, "clean" electrolyte (a 20–45% solution in water), say 300 ml for a 22 Ah cell, is placed in the wash flask 18. Switch S4 is opened, thus leaving both water control valves (V2, V3) permanently closed. The system is now put into operation and the cell 10 is inverted to facilitate withdrawal of the contaminated electrolyte. Other contaminants encountered and undesirable in a nickel-cadmium cell are potassium nitrite and nitrate, foaming agents and solid particles in suspension in the electrolyte. Some contaminants like lithium and cobalt hydroxides are occasionally intentionally added in the electrolyte for particular applications. When the timer causes the vacuum to be applied, a quantity of the contaminated electrolyte is withdrawn from the cell 10 into the wash flask 18. It then mixes with the much larger quantity of fresh electrolyte in the wash flask 18 and causes only a small degradation of the "clean" electrolyte because of the larger volume of "clean" electrolyte as compared to contaminated electrolyte. When the vacuum is released on the second part of the cycle, the vacuum in the cell causes electrolyte from the wash flask to flow into (and fill) the cell, thus adding nearly fresh electrolyte. This mixes with remaining contaminated electrolyte in the cell, so that on the next vacuum cycle, more relatively contaminated electrolyte is withdrawn and the process is repeated. The time intervals between vacuum cycles range between about 30 seconds and 2 minutes, preferably, about 1 minute. Eventually, the electrolyte in the wash flask and in the cell are of equal concentration and contamination. However, due to the relative quantities when the process was started the quality of the electrolyte in the cell is now much higher than it was originally i.e. the contamination is substantially reduced.

An important advantage over the prior art systems which employ a process in which the contaminated electrolyte is completely extracted out of the cell under high vacuum and is replaced with fresh electrolyte of the proposed process is the fact that it requires only a primary vacuum. Such a vacuum can be obtained from a modified water tap, vacuum cleaner apparatus or a vacuum provided in building facilities.

The proposed process also contemplates the option to wash the cell if necessary. The term washing is here used to denote washing with water as distinct from electrolyte exchange or regeneration in which electrolyte is placed in the wash flask. To operate the process fully automatically on a continuous basis the procedures are as follows: Switch S4 is closed to activate the water exchange valves V2 and V3. It is necessary to make preliminary adjustments of the water supply to the flask and to start the siphoning action. This is most conveniently done when the vacuum system does not interfere. Switch S2 is opened at a time when the cam causes the vacuum valve to be closed. The timer 34 then stops running and leaves S3 in the correct position for as long as desired. The water source 36 may then be temporarily connected to the siphon outlet 38 and water is permitted to fill the siphon tubing 40 and about half of the wash flask 18. The water source is then reconnected to the water inlet line 39 and is adjusted to compensate the water loss via the siphon. If the cell has not already been connected, this is done and the cell is inverted. Switch S2 is closed again and the full system starts to operate. Alternate adjustments of water flow in and out are made by using the clamp 32 on the siphon tubing and the water source, to give the desired rate of flow and balance during actual operating conditions.

The water wash may be employed prior to electrolyte exchange or regeneration. This pre-wash means that gross contaminants may be removed with water. Thus, expensive electrolyte is saved and when the electrolyte is then employed as washing liquid, a lower contaminant concentration is achieved without having to replace the electrolyte wash which is sometimes required if the pre-wash is not employed. This is thus more economical and electrolyte disposal problems are reduced. In this respect, care must be taken in the disposal of electrolyte due to its corrosive action on plumbing.

The following example illustrates the effectiveness of the system described. A nickel/cadmium cell with KOH as electrolyte which was found to contain 22%/w KOH and 11.1%/w potassium carbonate was connected to the system. A one-liter wash flask containing 800 ml of water was used. Vacuum mixing was continued for 20 minutes. The large wash flask was then replaced with a 500 ml flask containing 150 ml of 45%/w "clean" potassium hydroxide solution in water. Vacuum mixing was continued for another 20 minutes. At the end of the above 40 minute treatment the free electrolyte in the cell was found to contain 32.5%/w KOH and 1.3%/w potassium carbonate.

It will be appreciated by those skilled in the art that while the method and apparatus has been described herein with specific reference to a single nickel/cadmium cell employing potassium as electrolyte, they are equally applicable to other systems such as nickel-zinc, nickel-iron and lead-acid without departing from the spirit or central characteristics of the invention.

It is also contemplated that the electrolyte exchange be exchanged in multi-cell systems. In fact, applicant has developed a prototype that exchanges the electrolyte in ten cell Ni/Cd system. This basically involves increasing the volume of the wash flask to accommodate the larger number of cells.

The embodiments of the invention in which an exclusive property or privilege is claimed are defined as follows:

1. A process for the regeneration of contaminated electrolyte outside an electrolytic cell, comprising:
   (a) providing an electrolytic cell containing a volume of contaminated electrolyte;
   (b) providing an external reservoir for containing a larger volume of clean electrolyte of suitable battery concentration and connecting said reservoir to said cell;
   (c) applying a vacuum to said external reservoir to withdraw a quantity of the contaminated electrolyte from said cell into said external reservoir;
   (d) mixing the contaminated electrolyte with said larger volume of clean electrolyte of suitable battery concentration in said external reservoir;
   (e) releasing the vacumm in said external reservoir to return the mixed electrolyte to said cell; and
   (f) repeating steps (c) to (e) until the concentration of contaminant in the cell electrolyte and the reservoir electrolyte are substantially equal.

2. A process according to claim 1, wherein the electrolytic cell is a nickel/cadmium cell and the electrolyte is clean potassium hydroxide of a concentration of about 20–45%/w in water.

3. A process according to claim 1, wherein prior to the process defined therein steps (a) to (d) are conducted using water instead of clean electrolyte in the reservoir.

4. A process according to claim 1 wherein the time interval between repeating steps (b) to (d) is about 30 seconds to 2 minutes.

* * * * *